3,471,361
PAPER FROM DEINKED FIBERS INCLUDING SCAVENGED CONTAMINANTS AND FIBROUS ALKALI METAL TITANATE
Harold C. Brill, Wilmington, Del., assignor to E. I. du Pont de Nemours and Company, Wilmington, Del., a corporation of Delaware
No Drawing. Continuation-in-part of application Ser. No. 468,604, June 30, 1965. This application May 20, 1968, Ser. No. 736,919
Int. Cl. D21h 3/78; C08h 17/04
U.S. Cl. 162—8                                          7 Claims

ABSTRACT OF THE DISCLOSURE

Paper from pulp stabilized against scale and speck formation comprising deinked waste paper fibers and a white, pigmentary fibrous alkali metal titanate in the amount of 0.1 to 10% by weight.

CROSS REFERENCES

This application is a continuation-in-part of application Ser. No. 468,604, filed June 30, 1965, and now abandoned.

BACKGROUND OF THE INVENTION

Waste paper is an important source of fibrous material for use in the pulp and paper industry. Its employment therein is attended with certain disadvantages. Thus, waste paper must be subjected to a deinking treatment and certain difficulties are encountered due to the presence of thermoplastic resin-containing adhesives and pitch contaminants dispersible in the deinking slush which form unsightly specks and scale on the finished paper.

In manufacturing paper from repulped waste paper in accordance with conventional procedures such as described in the pamphlet "Deinking of Waste Paper" TAPPI Monograph Series No. 16, published by The Technical Association of the Pulp and Paper Industry, it is customary to slush the disintegrated waste paper stock in water and cook it with an alkali dispersing agent and various materials to disperse the printing ink pigment for removal from the stock by washing. The brightness of the washed stock is then improved by bleaching. In these cooking and washing operations, filler and coating pigments are also dispersed and separated from the fibers along with fine fibers and fiber filaments not retained by the fiber mat on the washers. The effluent from the washer contains the dispersed ink, filler, coated pigment and fines.

In processing magazine and book waste paper, various contaminants are encountered, including binding pins, metals, cinders, binding and water insoluble adhesives, binding cloth, polyvinyl acetate or other hot melt adhesives, plastic coating or polyethylene and cellulose or plastic films, laminated covers, clay or calcium carbonate fillers, starch and casing adhesives, ground woods, inks containing synthetic resins, ink dyes and pigments, etc. Solid contaminants can be removed from the stock through gravitational separation as in a pressure drop centrifugal separator, or through a screening operation. Binding adhesives soluble in the cooking liquor can in some instances be washed away, but polyvinyl acetate or other thermoplastic hot melt adhesives, though dispersible in the deinking process are very difficult to remove completely. Their presence even in relatively small amounts in the final product is highly deleterious because they recoagulate on the paper product and form unsightly scale and specks which vary in color. The presence of as little as 2 pounds of thermoplastic hot melt adhesive in the stock can cause 100 tons of otherwise satisfactory fiber to be unuseable. A similar phenomena occurs when the more common pitch (a material largely consisting of a mixture of fats and resins extracted from wood) is present. This material causes dirt spots or specks in the paper due to its coagulation on the Fourdrinier wire or coagulates in unsightly blotches in the paper.

In manufacturing paper, the first step involves preparation of the pulp so that it will readily mat or felt well. Color, filler and size are usually added to the pulp. Filler serves to fill the tiny spaces between the pulp fiber and make a smoother, opacified sheet with improved ink-absorbing characteristics. Size addition serves to render the sheet resistant to water or ink. Following such pulp preparation, filler, size and color addition, the pulp, consisting of about 99% water, is charged to a Fourdrinier type paper machine for flow, first onto an endless wire belt. Water is removed by gravity and by suction, and the wet sheet formed is then caused to pass on a felt through press rollers to effect further water removal. The sheet is then dried by passage over a series of heated rollers arranged in tiers, with the finished paper coming out of the dry end of the machine as a continuous sheet. A cylinder machine, of the type used for making paper board, may be used in a manner similar to that described for the Fourdrinier machine.

SUMMARY OF THE INVENTION

In accordance with this invention, the deleterious effects which the coagulation of organic adhesives and pitch contaminants exert on the surfaces of paper products derived from deinked waste paper are effectively overcome by incorporating fibrous pigmentary alkali metal titanate as an essential filler or opacifying agent in the pulp or stock employed in paper manufacture.

In a more specific and preferred embodiment, the invention comprises preventing objectionable speck and scale formation on paper surfaces due to agglomeration of organic adhesives and pitch contaminants present in deinked waste paper book and magazine stock, by employing as a paper filler or opacifying agent, and preferably in conjunction with clay, silica, titanium dioxide or other pigmenting fillers, from .1 to 10%, on a commodity basis, of a white pigmentary fibrous alkali metal titanate, such as sodium and potassium hexatitanate fibers and which are highly refractive of visible light, highly adsorptive toward said contaminants, and prevent agglomeration of the latter and mask their poor color.

To offset and overcome the deleterious, unsightly scale and speck formation encountered by reason of thermoplastic adhesive and pitch contaminants recoagulation in papermaking, there is incorporated in the papermaking system certain useful water-insoluble, white, surface active fibrous pigmentary titanates with sufficiently high surface areas to become effective in adsorbing particles of the dispersed, non-coagulated contaminants coming through in the deinking process or slush. These scavenging agents can be added as essential pigmenting ingredients to the deinked waste cellulosic paper pulp and preferably after the pulp slurry has been suitably beaten in accordance with usual papermaking practice. If desired, they can be used as the sole filler or opacifier in the pulp, but preferably use thereof is effected in conjunction with well-known paper pigments or fillers, such as clay, silica, titanium dioxide, etc., and in amounts ranging from approximately .1 to 10% by weight, based on the total ingredients in the pulp.

Fibrous pigmentary titanates, or mixtures thereof, utilizable in the invention comprise those of pigmentary type, i.e. have fiber lengths ranging from 10 to 100 times, and preferably from 50–100 times, their diameter, with average diameters in the range of from 0.1–0.6 micron and preferably from .1–.3 micron. They correspond to the formula $M_2O(TiO_2)_n$ in which M is an alkali metal having an atomic number greater than 11, i.e. sodium, potassium, rubidium and cesium, and $n$ has a value from 4 to 9 and preferably from 6–7. Especially effective, and therefore preferred for use, are fibrous pigmentary potassium titanates corresponding to the formula $K_2O(TiO_2)_n$, and fibrous sodium titanates corresponding to the formula $Na_2O(TiO_2)_n$, with the value $n$ in each formula being from 4–9, as well as various mixtures of these potassium and sodium titanates. These titanates can be prepared as described in U.S. 2,841,470 by dissolving a non-fibrous alkali metal titanate in a fused, heated salt melt of an alkali metal chloride or fluoride, maintaining a portion of the molten halide saturated with the dissolved compound as the fibrous alkali metal titanate is formed and then separating the crystallized titanate fibers from the salt by water reaction. Also, such titanates and particularly hexatitanates in which $n$ is essentially 6 in the above formula can be prepared in accordance with the procedures of U.S. 2,833,620 wherein reaction is effected of an alkali metal hydroxide or carbonate with titanium dioxide under aqueous conditions above the critical temperature and pressure of water, that is above 400° C. and pressures of at least 200 atmospheres. Similarly, as disclosed in Ser. No. 279,580 (May 10, 1963) now U.S. 3,328,117 and 645,755 (June 1967) improved forms of such pigmentary fibrous alkali metal titanates can be obtained by blending and compacting a mixture of basic oxygen-containing alkali metal compound, particularly a hydroxide or carbonate of sodium or potassium, with a titanium compound such as titanium dioxide in the molar ratio of titanium compound to alkali metal compound of from 2:1 to 8:1, and then converting the mixture to a fibrous product predominantly in pigmentary size range having a particle diameter ranging from 0.1–0.6 micron with lengths ranging from 10 to 100 times said diameter, through calcination treatment in the range of from 850–975° C. Other suitable fibrous alkali metal titanates are described in U.S. 3,331,660, 3,328,117, 3,129,105 and U.S. application Ser. No. 705,291 filed Mar. 7, 1968.

To a clearer understanding of the invention the following specific example is given. This is merely illustrative of and is not to be construed as limiting the underlying principles and scope of the invention.

Example I

A Fourdrinier commercial size papermaking machine after being operated for 20 hours in the production of a high quality titanium dioxide containing paper employing bleached magazine slush as stock, became contaminated with coagulated resinous adhesive which cause unsightly specks and scale on the paper product and hence was shut down. The contaminated stuff and apparatus was thereupon flushed free of the coagulated adhesive material and production was resumed using the same deinked waste pulp but containing a fibrous pigmentary potassium titanate material having an average size ranging between 0.1 and 0.5 micron in diameter with lengths varying between 25 and 100 microns in place of 10% of the sole titanium dioxide filler previously employed. The specks and scales previously resulting from adhesive coagulation were no longer experienced on the final sheets which were found to require less fluorescent dye and less filler than previously necessary with non-fibrous $TiO_2$ pigment use. In addition, for an equal opacity and brightness, less fluorescent dye and less filler was needed and the resulting paper was found to be desirably less abrasive than that obtained from the use of titanium dioxide material alone as a filler.

As above noted pigmentary fibrous metal titanates of this invention act to prevent coagulation on the surfaces of the paper product and on the screens of resinous contaminants present in the paper pulp. Such titanates and especially those of sodium and potassium hexa- and tetra-titanates which are white and highly reflective to visible light advantageously provide an improved paper from deinked pulp while increasing the dispersibility and decreasing the harmful effects of the coagulation of resinous adhesives on the paper surface. In consequence the previous discrimination required to be exercised in the selection of scrap paper for the manufacture of white paper due to insufficiencies during the deinking processes in removing thermoplastic adhesives is eliminated by this invention. While the invention has been described as applied to the production of certain deinked waste papers, it has general application to the production of book paper consisting of sulfite or bleached sulfate and soda pulp and waste paper together with about 20% clay and other nonfibrous materials; to the manufacture of tissue paper, consisting chiefly of sulfite, sulfate and ground wood pulp and waste paper; to paper board manufacture obtained from waste paper and unbleached as well as sulfate pulp and to other grades of board such as chipped board made up almost entirely from waste paper, as well as other grades containing a portion of virgin wood pulp and paper and principally useful in the manufacture of cartons or containers.

Many equivalent modifications will become apparent to those skilled in the art from a reading of the above without a departure from the inventive concepts.

I claim:

1. A paper substantially free from speck and scale formation comprising deinked waste paper and from about 0.1 to about 10 percent, inclusive, by weight, based on the weight of the said paper of a pigmentary fibrous alkali metal titanate, the fibers of the said titanate having average diameters of from 0.1 to 0.6 micron, inclusive, and having lengths of from 10 to 100 times, inclusive, their diameters, and bearing a distributed adherent deposit of scavenged contaminants from said deinked waste paper fibers.

2. The paper of claim 1 wherein the said alkali metal is potassium.

3. The paper of claim 1 wherein the said alkali metal is sodium.

4. A recovered waste paper pulp comprising an aqueous dispersion of deinked waste paper fibers and from about 0.1 to about 10 percent, inclusive, by weight based on the weight of the said paper of a pigmentary fibrous alkali metal titanate, the fibers of the said titanate having average diameters of from 0.1 to 0.6 micron, inclusive, and having lengths of from 10 to 100 times, inclusive, their diameters, the said fibrous titanates bearing a distributed adherent deposit of scavenged contaminants from the said waste paper fibers.

5. A process for forming paper which comprises forming an aqueous slurry of deinked waste paper fibers containing non-coagulated contaminants, adding to said slurry from about 0.1 to about 10 percent, inclusive, by weight based on the weight of solids in said slurry of a pigmentary fibrous alkali metal titanate, the fibers of the said titanate having average diameters of from 0.1 to 0.6 micron, inclusive, and having lengths of from 10 to 100 times, inclusive, their diameters to adsorb said contaminants, and forming paper from said slurry.

6. The process of claim 5 wherein the said alkali metal is potassium.

7. The process of claim 5 wherein the said alkali metal is sodium.

References Cited

UNITED STATES PATENTS 2,841,470  7/1958  Berry _____ 23—51
3,328,117  6/1967  Emslie _____ 162—181

HOWARD R. CAINE, Primary Examiner

U.S. Cl. X.R.

106—282; 162—145, 147, 181